No. 864,198. PATENTED AUG. 27, 1907.
F. SCHAUMBURG.
MACHINE FOR CUTTING CORKS.
APPLICATION FILED FEB. 26, 1906.

5 SHEETS—SHEET 1.

Witnesses:

Inventor:
Franz Schaumburg

No. 864,198. PATENTED AUG. 27, 1907.
F. SCHAUMBURG.
MACHINE FOR CUTTING CORKS.
APPLICATION FILED FEB. 26, 1906.

5 SHEETS—SHEET 2.

Witnesses:
Jesse N. Lutton
R. Bommers

Inventor:
Franz Schaumburg
by Henry Orth
Atty.

No. 864,198. PATENTED AUG. 27, 1907.
F. SCHAUMBURG.
MACHINE FOR CUTTING CORKS.
APPLICATION FILED FEB. 26, 1906.

5 SHEETS—SHEET 3.

Witnesses:
Jesse H. Lutton.
B. Sommers

Inventor:
Franz Schaumburg
by Henry Orth
Atty.

No. 864,198. PATENTED AUG. 27, 1907.
F. SCHAUMBURG.
MACHINE FOR CUTTING CORKS.
APPLICATION FILED FEB. 26, 1906.

5 SHEETS—SHEET 4.

Witnesses:
Jesse N. Lutton.
B. Dommers

Inventor:
Franz Schaumburg
by Henry Orth
Atty

THE NORRIS PETERS CO., WASHINGTON, D. C.

No. 864,198. PATENTED AUG. 27, 1907.
F. SCHAUMBURG.
MACHINE FOR CUTTING CORKS.
APPLICATION FILED FEB. 26, 1906.
5 SHEETS—SHEET 5.
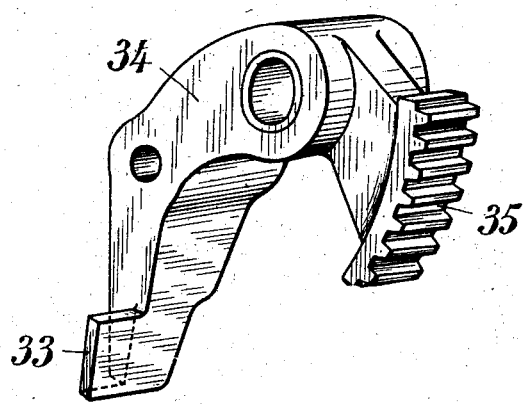
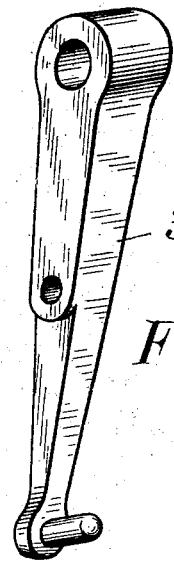
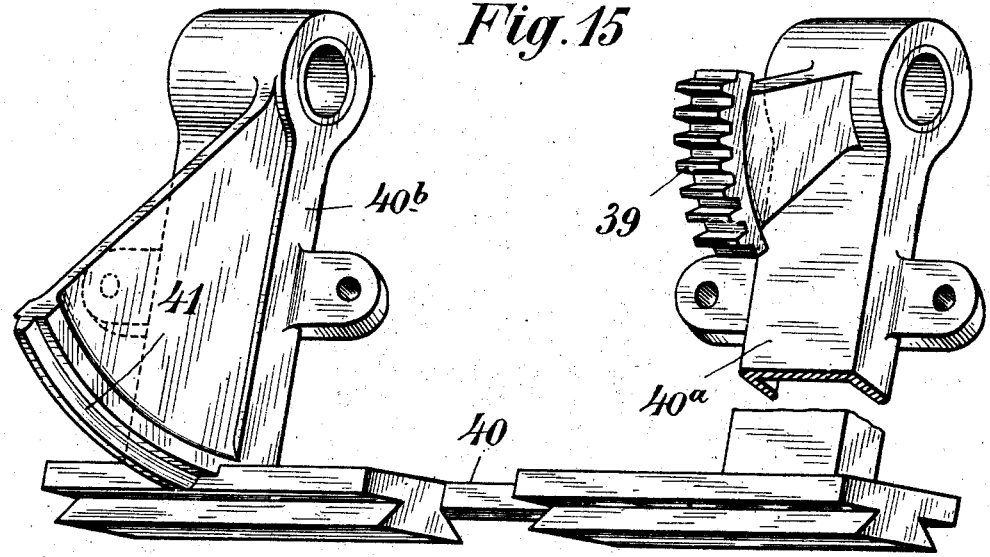
Witnesses:
Inventor:
Franz Schaumburg
by Henry Orth
Atty

UNITED STATES PATENT OFFICE.

FRANZ SCHAUMBURG, OF ZURICH, SWITZERLAND, ASSIGNOR TO ALFRED SLUSSI-WIDMER, OF ZURICH, SWITZERLAND.

MACHINE FOR CUTTING CORKS.

No. 864,198.      Specification of Letters Patent.      Patented Aug. 27, 1907.

Application filed February 26, 1906. Serial No. 303,106.

*To all whom it may concern:*

Be it known that I, FRANZ SCHAUMBURG, a subject of the Emperor of Austria, residing at Zurich, in Switzerland, have invented new and useful Improvements in Machines for Cutting Corks, of which the following is a specification.

The subject of this invention is a machine for cutting corks from block-shaped blanks with minimum waste of material.

The improved machine comprises a knife for cutting the blank, a feed-device for conveying the blank to the knife, an arm for pressing the side of the blank against the said knife, a rod for adjusting the blank relatively to twor otary members, located opposite each other and designed to seize the ends of the blank, and, after it has been released by the feed-device, the presser-arm and the adjusting-rod, to rotate it relatively to the blade, in such manner that the latter cuts from the blank a cork whose cross section touches the three sides of the blank which have been pressed between the presser, the adjuster and the knife.

One form of construction of the new machine is illustrated in the accompanying drawings.

Figure 1:
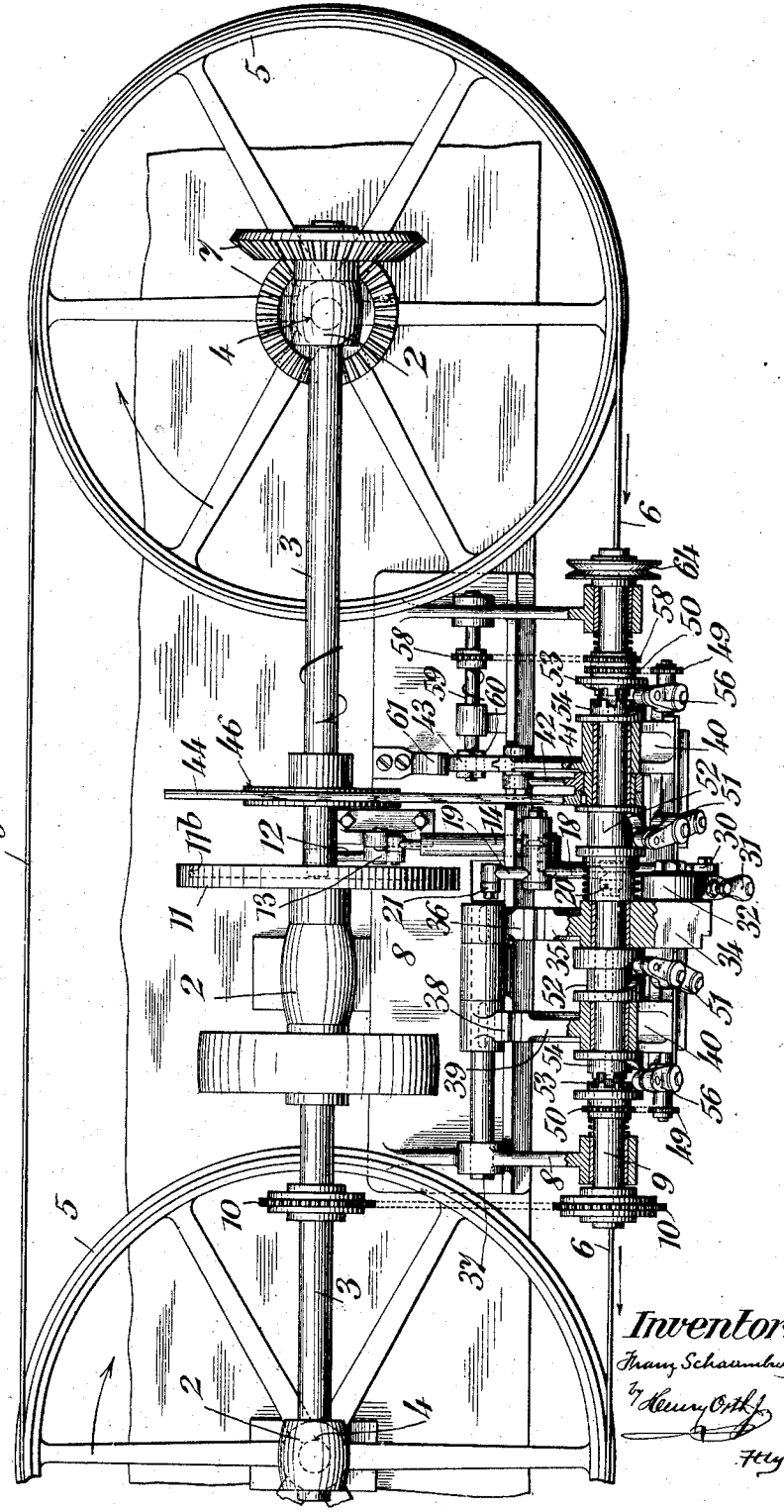
Figure 2:
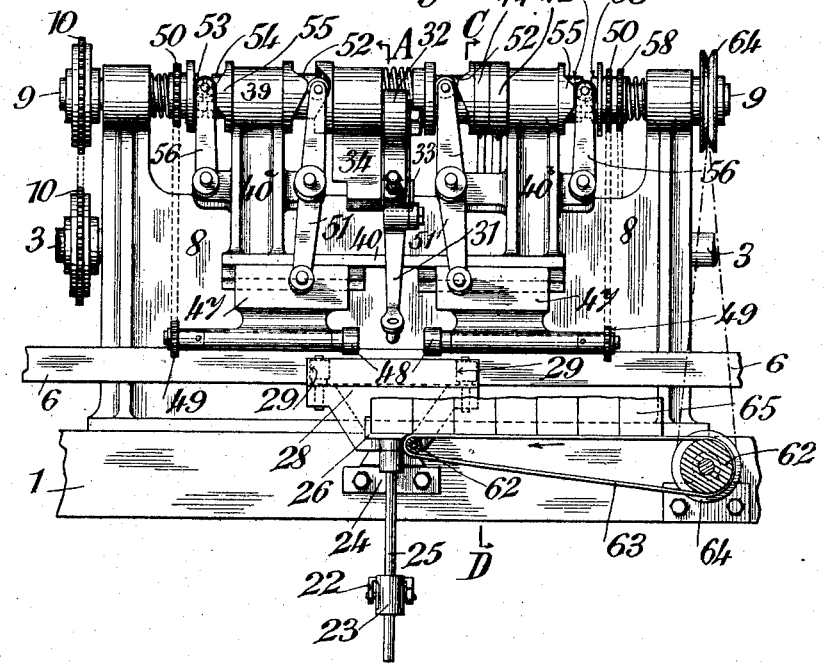
Figure 3:
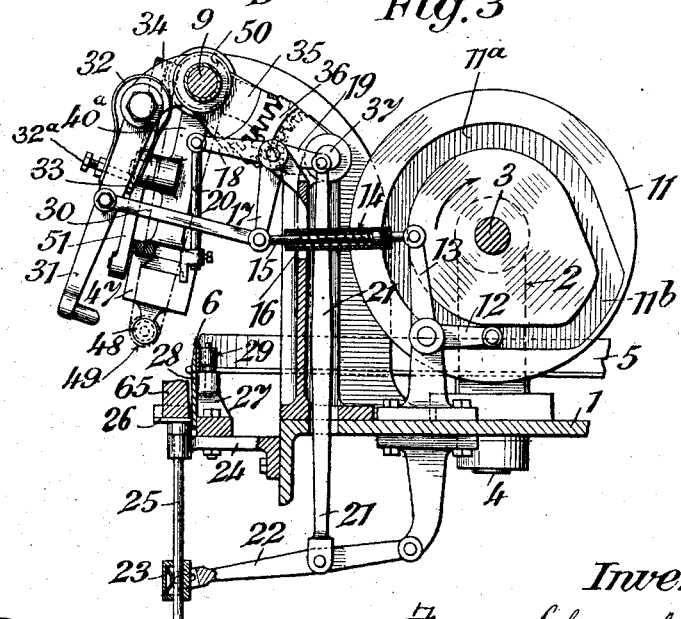
Figure 4:
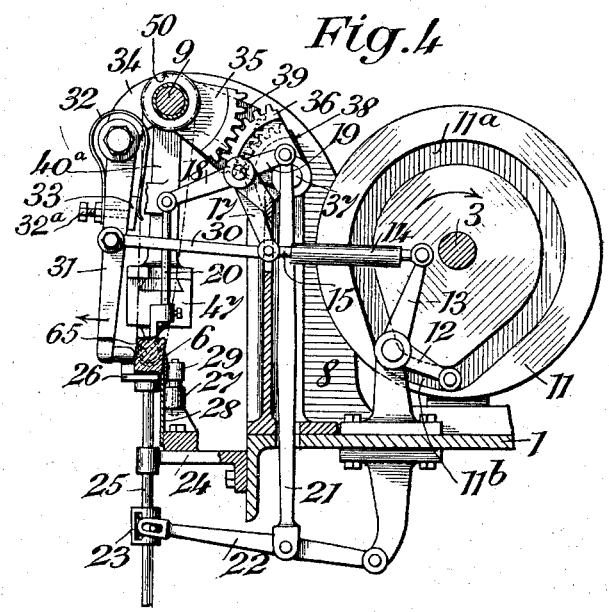
Figure 5:
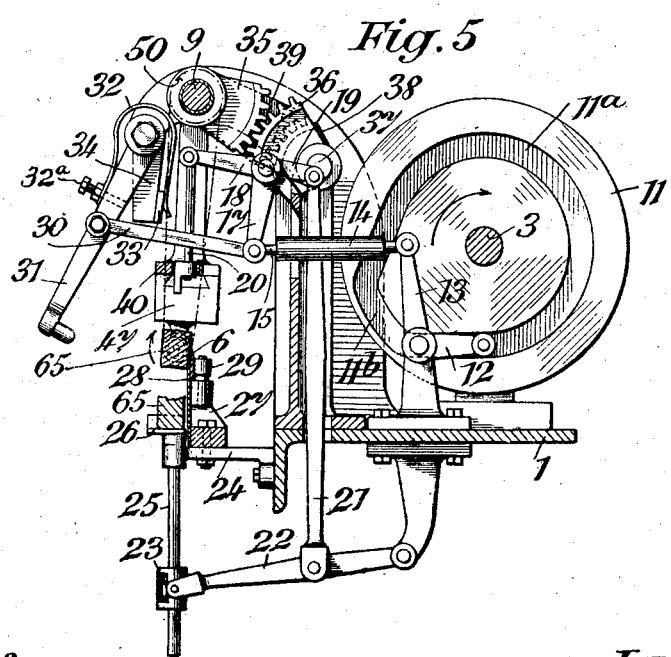
Figure 6:
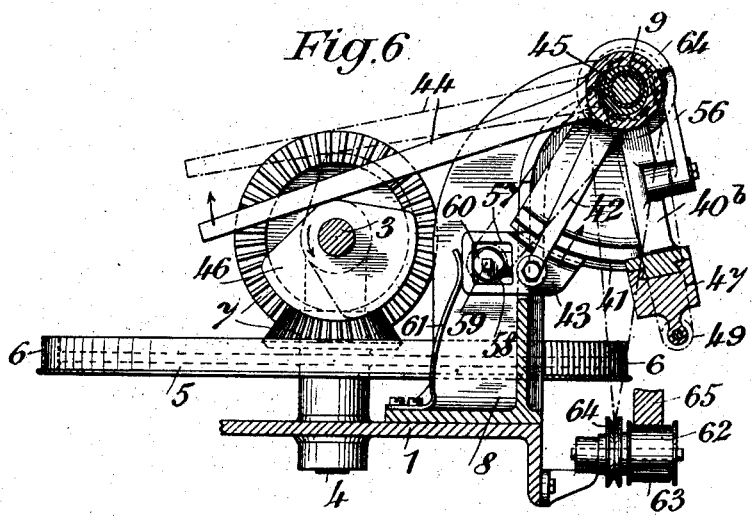
Figure 7:
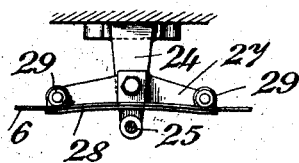
Figure 8:
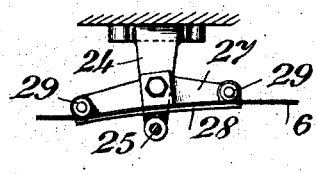
Figure 9:
Figure 10:
Figure 12:
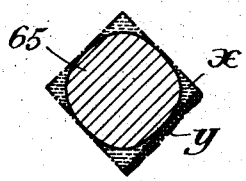
Figure 11:
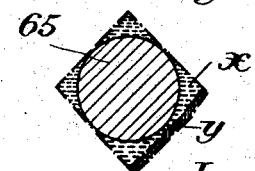

Figure 1 is a plan of the machine, partly in section, Fig. 2 a part sectional elevation, Fig. 3 a section on the line A—B of Fig. 2. Figs. 4 and 5 are similar views at different stages of working. Fig. 6 is a section on the line C—D of Fig. 2, the operative members being in the position shown in Figs. 1, 2 & 3. Figs. 7 & 8 are detail views of parts to be hereinafter referred to. Figs 9 & 10 show two corks of different shapes turned out by the machine, drawn to an enlarged scale. Figs. 11 & 12 show cross sections of two such corks, the blanks from which they have been cut being indicated by broken lines. Figs. 13 and 14 are perspective views of the arms 34 and 31 respectively. Fig. 15 is a perspective view of the U-shaped frame 40.

Above the table 1 of the machine, there is mounted in bearings 2 the driving-shaft 3. The two end bearings present vertical pins 4, on which the pulleys 5 are loosely mounted. The endless band-knife 6 runs on these pulleys with its cutting edge upward. One of the pulleys 5 is coupled with the shaft 3 by means of bevel gears 7.

8 is an upright frame secured to the table 1, and having mounted in it a shaft 9, lying parallel with the shaft 3, and from which it is driven by means of sprocket gearing 10.

On the shaft 3 there is mounted a cam 11 having on one face a groove possessing two concentric portions $11^a$, $11^b$ the latter of which has a longer radius than the former, but is of shorter extent. In the groove there runs a roller, attached to the end of the one arm 12 of a bell-lever fulcrumed to the table 1; the other arm 13 of this lever is connected with a closed cylinder 14, in which is located a rod 15 provided with a head. Round the rod there is coiled a spring 16, Fig. 3 so that there is a resilient connection between the arm 13 and the rod 15. The latter is jointed to the arm 17 of a three-limbed lever 17, 18, 19 fulcrumed to the frame 8. Pendent from the arm 18 is a loosely hanging rod 20 with an adjustable finger at the end. The third arm 19 of the said lever is connected by the rod 21 with a lever arm 22 fulcrumed on the underside of the table 1. The lever arm 22 carries at its end a clutch sleeve 23, fitting tightly on the rod 25 by means of a spring. The rod 25 receives vertical guidance from a bracket 24 and carries at the top a plate 26 provided with a stop. The spring within the clutch sleeve 23 is not so strong as to prohibit sliding of the rod 25 in the lifter. The bracket 24 is secured to the front of the table 1 and carries behind the plate 26 a small bracket 27, which is provided with a straight guide plate 28 and rollers 29 behind it. Between the plate and rollers there travels the band-knife 6, with its cutting edge projecting above the top chamfered edge of the plate 28.

The arm 17 of the three armed lever 17, 18, 19 is connected by a rod 30 with an arm 31 fulcrumed in the arm 34. To the arm 31 is secured by a bolt $32^a$ one end of a flat spring 32, the other end of which takes over the upper end of the arm and behind a lug 33 on arm 34. The tendency of this spring is to press the arm 31 against the stop 33 of the arm 34 of a lever 34, 35 (Figs. 5 and 13) mounted loosely on the shaft 9. The other arm 35 of this lever constitutes a toothed segment, which meshes with a twin segment 36 fixed to a loosely mounted shaft 37, which is mounted in the frame 8, parallel with the shafts 3 and 9. On this shaft 37 there is secured a second toothed segment 38, which meshes with the segment-shaped arm 39 of a swinging U-shaped frame 40, having two arms $40^a$ $40^b$ loosely mounted on the shaft 9. The radius of the segment 38 is only half as large as that of the segment 39. The arm $40^b$ (Figs. 1 and 15) of the frame 40 is provided with a brake-segment 41 (Figs. 6 and 15), upon which the shoe 43 of the rod 42 can act. The rod 42 is loosely mounted on the sleeve 45, which is eccentrically mounted to turn on the shaft 9 and is connected with a lever arm 44. The latter rests on the periphery of a cam-plate 46 mounted on the shaft 3, adjacent to the already mentioned cam 11.

On the underside of the frame 40 are two slides 47, lying in the same vertical plane and traveling in horizontal guides. In the slides there are mounted two spindles having heads 48. These spindles are driven from the shaft 9 by sprocket gear 49, 50. On the frame 40 there are fulcrumed two-armed levers 51, whose lower arms engage the slides 47; while their upper arms are furnished with rollers, which run on the cams 52 mounted on the shaft 9. One cam 52 comprises two halves, of which the one is rigidly mounted on the shaft 9 and presents the cam-track; while the other half slides on the hub of the first half, is spring-controlled, and is shaped as a collar with a flat inner face. The sprocket wheels 50 are secured to the half-clutches 53 of the toothed clutches 53, 54. The parts 53 are loose on the shaft 9, are spring-controlled, and have an annular shoulder with smooth inner face. The parts 54 are keyed on the shaft 9, and have likewise an annular shoulder, but with cam-tracks 55. Between the shoulders of the two clutch-halves 53, 54 of each pair, there engages the end of a lever-arm 56 carrying a small roller and fulcrumed to the frame 40.

The brake shoe 43 has a flat prolongation, perforated at 57, into which there projects one end of a shaft 59, Fig. 6 which is mounted to turn in the frame 8. This shaft is driven from the shaft 9 (Fig. 1) by means of sprocket gearing, one sprocket wheel of which is carried by the clutch-half 53. On the said end of the shaft 59 patterns 60 can be set, the form depending upon the cross-section the cork is to have (compare Figs. 11 and 12). The inner wall of the hole in the shoe 43 is forced against the periphery of the pattern 60 by means of a spring 61. At the front of the table 1 an endless band 63 is provided, running round rollers 62, and driven from the shaft 9 by means of grooved pulleys and a cord. The band 63 serves to convey the cork blocks 65 to the plate 26, the top half of the band 63 lying at the level of the plate 26 when the latter is in its lowest position (Fig. 2).

If desired, the heads 48 may be roughened or provided with studs on their faces, to enable them to take a better grip on the cork-blanks 65.

The operation of the machine is as follows: On rotation of the shaft 3 in the direction of the arrow Fig. 1, the band-knife 6 will be caused to travel in the direction of the arrow by means of the bevel gear 7 and pulleys 5. In like manner the shaft 9 will be driven by the shaft 3 and sprocket gearing 10 in the same direction as the latter shaft, and the endless band 63 will travel in the direction of the arrow shown in Fig. 2. The arm 31 will receive an oscillating motion from the rod 30 actuated by the parts 12—16 from the cam wheel 11. After each oscillation the arm 31 will remain for a longer or shorter period in its outer or inner end position respectively, depending upon whether the roller of the arm 12 is in the longer or shorter concentric path 11$^a$ or 11$^b$ of the cam-groove. The pendent rod 20, by means of the parts 12—18 actuated by the cam 11, is given a certain up and down motion. The plate 26 will at the same time receive a similar, but opposed, motion from the cam 11 and parts 12—17 and 19, 21, 22, 23, 25. Both parts 20 and 26 will remain stationary for a short interval in their lower and upper end-positions, and for a longer interval in their upper and lower end-positions. When the arm 31 swings inwardly, it strikes the stop 33 of the arm 34, whereby the segments 35, 36 and 38, 39 will be turned. The frame 40 will thus also be swung inwardly, but owing to the different radii of the segments 38, 39, its oscillation will only be one half that of the arm 31 from the moment of its striking the stop 33. The frame 40, with slides 47, is held in its innermost position by the action of the brake. This is effected by the cam-plate 46, turning the arm 44 in the direction of the arrow in Fig. 6, whereby, owing to the eccentric sleeve 45 which turns with it, the rod 42 will press the shoe 43 against the segment 41. The slides 47 are reciprocated toward and from each other by the levers 51 being turned by the cams 52. The heads 48 are rotated by the sprocket gear 50, 49, on the clutches 53, 54 being thrown in; this is the case when, owing to the rotation of the part 54, the lever 56 leaves the cam-track 55, whereupon the movable part 53 will engage with the stationary part 54, and, together with the sprocket-wheel 50, will be rotated by it. On such rotation of the sprocket-wheels 50, the shaft 59 will be rotated by the sprocket-wheel 58, which is connected by a chain to the part 53 of one of the clutches.

The cork blanks 65 lie on the endless band 63 with their outer side $y$ (Figs. 11 & 12) downward, and in the case of ordinary dimensions they are cut in the following manner.

At the commencement of the operation the whole of the working-parts are in the position shown in Figs. 1, 2, 3 & 6. That is to say, the arm 31 and frame 40 occupy their outermost position, the rod 20 and plate 26 their uppermost and lowermost positions respectively; and the roller of the arm 12 is about to leave the longer concentric path 11$^a$ of the groove in the cam wheel 11. Let it be further assumed that a cylindrical pattern 60 has been fitted on the shaft 59. On rotation of the shaft 3, with cam wheel 11, the roller of the lever 12 enters the path 11$^b$ of the cam groove, and one of the blanks 65 lying on the plate 26 will be lifted approximately to the level of the cutting-edge of the knife 6; and owing to the arm 31 swinging inward, the blank will be forced against the plate 28 and the knife 6 which projects above the latter. At the same time the blank will be pressed down upon the plate 26 by the descending rod 20. Simultaneously with the arm 31, the frame 40 with slides 47 will swing inward, and the heads 48 will come into such position that their axis lies in the center of the cork blank 65, that is to say, in the center of the space between knife edge and finger of the arm 31, and on a level with the said cutting-edge. The lower end of the finger of the rod 20 will at this moment lie at the same radial distance from the axis of the heads 48, as the finger of the arm 31 (position, Fig. 4). The frame 40 is retained in its position by the cam plate 46 causing the shoe 43 to be pressed against the segment 41, whereupon the two heads 48 will close upon the blank 65 and grip it between them. The roller of the arm 12 will now leave the path 11$^b$ of the cam-groove and enter the path 11$^a$, whereupon the parts 20, 26 will move into their uppermost and lowermost positions respectively, and the arm 31 returns to its outermost position. The parts will remain in such positions while the heads 48 with the blank 65 turn in the direction of the arrow in Fig. 5. During such rotation of the blank, the knife 6, which travels parallel with the axis of the blank, will cut from the latter a cylindrical cork, three of whose sides touch three sides of the blank, and whose shape (Fig. 11) corresponds in cross-section to that of the pattern 60 fitted on the end of the shaft 59; for during the rotation of the heads 48 no oscillating motion is imparted to the frame 40 (position, Fig. 5). The roller of the arm 12 now travels over the long path 11$^a$ of the groove in the cam wheel 11, and the spring 32 which presses against the back of the stop 33 of the arm 34 is stretched. Toward the end of the revolution of the shaft 3 the two heads 48 separate again and drop the finished cork, while, at the same time, through the rollers of the arms 56 ascending the cam-tracks 55, the clutches 53, 54 are disengaged, so that the axes of the heads 48, and the shaft 59 come to rest. The frame 40 will be released, owing to the cam-plate 46 causing the shoe 43 to descend, and will under the action of the spring 32 be returned to its outermost position, the stop 33 of the arm 34 thus lying against the arm 31 again. All the parts thus assume the positions shown in Figs. 1, 2 and 3 again. Meanwhile the band 63 will have fed forward another blank 65 onto the plate 26, which blank on further revolution of the shaft 3, will be raised by the rod 25, and the already described operations will be repeated and a second cork turned out.

With this machine, from blanks of normal size corks of equal dimensions can be cut; and from blanks which vary from each other in respect to length, height and breadth, corks can be cut of that size which involves least waste of material in each case. The cracked, useless outer side y of the blank is discarded in every instance. The object in view is attained in particular owing to the resilient connection between the members for raising and for holding the blanks. The spring 16, located inside the tubular member 14 and pressing against the head of the rod 15, admits of the bell lever 12, 13 executing its motion, as determined by the groove in the cam wheel 11, even when a blank of greater width comes between the knife 6 and arm 31, whereby the latter is prevented from swinging further inward. The frame 40, which shares the motion of the arm 31, always comes into such position that the axis of the heads 48 lies in the center of the breadth of the blank between knife 6 and arm 31. When a blank of greater height comes upon the plate 26, the blank together with the said plate will be pushed down by the rod 20 which makes a certain descent opposite the arm 31, until the distance from the axis of the heads 48 to the top of the blank, is equal to the half of the breadth of the same; that is to say, equal to the half of the distance between the finger end of the arm 31 and the cutting-edge of the knife 6, so that the line of cut of the knife again touches three sides of the blank. The plate 26 with rod 25 is enabled to slide downward, as described, owing to the spring connection between the clutch sleeve 23 and the rod 25. When, however, the arm 22 with clutch sleeve 23 returns to its lowermost position again, the rod 25 is first carried with it, until the plate 26 rests on the bracket 24, whereupon the clutch sleeve 23 will slide on the rod 25 into its original position relatively to the rod. Small differences in the length of the blanks do not affect proper operation of the heads 48, since the lever 51, owing to the provision of the movable half of the cam 52, can make a longer throw when required.

Since it is of advantage to utilize as much of the material of the blank as possible, for the purpose of obtaining a heavy cork, a pattern 60 of the form shown in Fig. 6 may be fitted upon the shaft 59. This pattern with the aid of the spring 61 during rotation of the heads 48 with the blank imparts a slight oscillatory motion to the frame 40 connected with the brake-shoe 43, in such manner that a cork of the section shown in Fig. 12 is turned out. With this form of cork, the corner portions x are more fully utilized than is the case with the cork shown in Fig. 11.

To cut a cork of cylindrical shape, the knife 6 is conducted along a plate lying parallel therewith; whereas to produce corks of conical shape, the small bracket 27 must be set at an angle. To produce corks as shown in Fig. 10, a curved plate must be used, as illustrated in Figs. 7 & 8 and the bracket 27 with plate 28 must be set as shown in the latter figure. The portion of the knife 6 which comes between the rollers 29 is then compelled to lie against the plate and assume its form. To produce a cork as shown in Fig. 9, which tapers conically toward both ends, the bracket 27 and curved plate 28 must be brought into the straight position shown in Fig. 7.

I claim.

1. In a cork cutting machine, in combination, a knife, means for feeding the blanks to the latter, an arm for pressing the blank against the knife, a pendent member for adjusting the blank and two rotary sliding jaws for centrally gripping the blank ends, and means for relatively moving the pressing arm, the adjusting member and the jaws to and from the knife, thereby holding the blank till it is released by the feeder, the presser, and the adjuster, and then turning it relatively to the knife, in such manner that the latter cuts out of the blank a cork whose cross sectional form touches the three sides of the blank pressed by the knife, the presser and the adjuster, substantially as described.

2. In a cork cutting machine, in combination, horizontal pulleys, a band-knife carried by the same, a vertically reciprocating blank feeder-plate; a swing-arm for pressing the blank against the knife; a vertically reciprocating rod for adjusting the blank; a swing frame oscillated by the said presser-arm; slides carried by the frame; headed spindles rotating in the slides and gripping the blanks between them; means for relatively moving the pressing arm, the adjusting rod and spindles to and from the knife; means for temporarily retaining the frame in its inner end position, in which position the axis of rotation of the headed spindles always lies in the center of the breadth of the blank; means for operating the presser and adjuster in such manner that the top of the blank lies at the same radial distance from the axis of the spindles as the other two sides do, which lie against the knife and the presser; and a shaft from which all the operative parts are driven; substantially as described.

3. In a cork cutting machine, in combination, a main driving shaft; horizontal pulleys, one of which is driven from the shaft; a band knife carried by the pulleys; a grooved cam-wheel mounted on the main shaft; a vertically reciprocating blank feeder; an oscillating blank presser and a vertically reciprocating blank adjuster, and means operated by the cam wheel for actuating the same; an auxiliary shaft driven by the main shaft; a frame mounted on the auxiliary shaft and oscillated by the presser; slides carried by the frame; headed spindles rotating in the slides and gripping the blanks between them; means actuated by a cam plate for temporarily retaining the frame in its inner end-position; and means whereby the auxiliary shaft is caused to reciprocate the slides and rotate the headed spindles, all operating substantially as and for the purposes described.

4. In a cork cutting machine, in combination, a main driving shaft; horizontal pulleys, one of which is driven from the shaft; a band-knife carried by the pulleys; a grooved cam-wheel mounted on the main shaft; a vertically reciprocating blank feeder; an oscillating blank presser and a vertically reciprocating blank adjuster, and means operated by the cam-wheel for actuating the same; an auxiliary shaft driven by the main shaft; a frame, a double-armed lever loosely mounted on the auxiliary shaft, one arm of which presents a stop for the presser, while the other arm presents a toothed sector; said auxiliary shaft loosely turning in bearings; a second toothed sector mounted on said shaft of the same size as the first, with which it meshes, a third toothed sector mounted on the auxiliary shaft, and a segment carried by the frame meshing with the third said segment but having twice as large a radius as the latter; and a spring secured to the pressure and holding the stop-arm of the said double-armed lever to it; slides carried by the frame; headed spindles rotating in the slides and gripping the blanks between them; means actuated by a cam-plate for temporarily retaining the frame in its inner end-position; and means whereby the auxiliary shaft is caused to reciprocate the slides and rotate the headed spindles, all operating substantially as and for the purpose described.

5. In a cork cutting machine, in combination, a main driving shaft; horizontal pulleys, one of which is driven from the shaft; a band-knife carried by the pulleys; a grooved cam-wheel mounted on the main shaft; a vertically reciprocating blank feeder; an oscillating blank presser and a vertically reciprocating blank adjuster, and means operated by the cam-wheel for actuating the same; an auxiliary shaft driven by the main shaft; a frame mounted on the auxiliary shaft and oscillated by the presser; slides carried by the frame; headed spindles rotating in the slides and gripping the blanks between them; and means whereby the auxiliary shaft is caused to reciprocate the slides and rotate the headed spindles; and means for temporarily retaining the frame in its innermost position, comprising a cam-plate mounted on the main driving shaft; an eccentrically and loosely mounted sleeve on the auxiliary shaft; a lever one end of which loosely embraces the sleeve while the other end rests on the cam-plate; an arm loosely embracing the sleeve and carrying a perforated spring actuated brake shoe at the other end; and a brake-segment carried by the frame and acted upon by the shoe; all operating substantially as and for the purposes described.

6. In a cork cutting machine, in combination, a main driving shaft; horizontal pulleys, one of which is driven from the shaft; a band-knife carried by the pulleys; a grooved cam-wheel mounted on the main shaft; a vertically reciprocating blank feeder; an oscillating blank presser and a vertically reciprocating blank adjuster, and means operated by the cam-wheel for actuating the same; an auxiliary shaft driven by the main shaft; a frame mounted on the auxiliary shaft and oscillated by the presser; slides carried by the frame; headed spindles rotating in the slides and gripping the blanks between them; means actuated by a cam plate for temporarily retaining the frame in its inner end-position; means whereby the auxiliary shaft is caused to reciprocate the slides, and means whereby the headed spindles are rotated by the same, comprising clutches on the auxiliary shaft, the one clutch-half being rigidly and the other loosely mounted thereon, the loose half being spring actuated; a cam track on the inner face of the rigid clutch-half; transmission gear connecting the loose clutch part with the headed spindles; an arm pivoted to the frame and carrying a roller which travels on the cam track of the clutch and against the loose clutch half; all operating substantially as and for the purposes described.

7. In a cork cutting machine, in combination, a main driving shaft; horizontal pulleys, one of which is driven from the shaft; a band-knife carried by the pulleys; a grooved cam-wheel mounted on the main shaft; a vertically reciprocating blank feeder; an oscillating blank presser and a vertically reciprocating blank adjuster, and means operated by the cam-wheel for actuating the same; an auxiliary shaft driven by the main shaft; a frame mounted on the auxiliary shaft and oscillated by the presser; slides carried by the frame; headed spindles rotating in the slides and gripping the blanks between them; means actuated by a cam-plate for temporarily retaining the frame in its inner end-position; means whereby the auxiliary shaft is caused to reciprocate the slides; and means whereby the headed spindles are rotated by the same, comprising clutches on the auxiliary shaft, the one clutch-half being rigidly and the other loosely mounted thereon, the loose half being spring actuated; a cam track on the inner face of the rigid clutch-half; transmission gear connecting the loose clutch part with the headed spindles; an arm pivoted to the frame and carrying a roller which travels on the cam track of the clutch; and against the loose clutch half a pattern shaft carried by the machine frame; transmission gear connecting it with the one loose clutch-half; and a pattern mounted on the shaft and protruding through a slot in the cam plate actuated means; all operating substantially as and for the purposes described.

8. In a cork cutting machine, in combination, horizontal pulleys, a band-knife carried by the same; a bracket; a pivotal plate adjustably secured thereto, and presenting a vertical wall and vertically mounted rollers, between which said wall and rollers the band-knife travels; a vertically reciprocating blank feeder-plate; a swing-arm for pressing the blank against the knife; a vertically reciprocating rod for adjusting the blank; a swing frame oscillated by the said presser-arm; slides carried by the frame; headed spindles rotating in the slides and gripping the blanks between them; means for relatively moving the pressing arm, the adjusting rod and spindles to and from the knife; means for temporarily retaining the frame in its inner end position, in which position the axis of rotation of the headed spindles always lies in the center of the breadth of the blank; means for operating the presser and adjuster in such manner that the top of the blank lies at the same radial distance from the axis of the spindles as the other two sides do, which lie against the knife and the presser; and a common shaft from which all the operative parts are driven; substantially as described.

9. In a cork cutting machine the combination with a moving knife; of a cork blank lifter to lift the blank to the cutting level, means simultaneously brought into action to press the blank against the knife, to relatively adjust the height of the lifted blank and grip the ends of the blank, and means to rotate the gripping mechanism.

10. In a cork cutting machine the combination with a moving knife; of a cork blank lifter to lift the blank to cutting level, means to engage the top of the blank and limit its lift, means to press the blank against the knife, a swinging frame swung into position by the pressing means, rotating gripping members in the frame to engage the ends of the blank, means to hold the frame in cutting position after the pressing and limiting means have been returned to their normal position, mechanism to rotate the gripping members and means to release them from the blank after the holding means has released the frame and it has swung away from the knife.

In testimony whereof I have signed my name to this specification in the presence of two subscribing witnesses.

FRANZ SCHAUMBURG.

Witnesses:
A. LIEBERKNECHT,
E. BLUM.